UNITED STATES PATENT OFFICE.

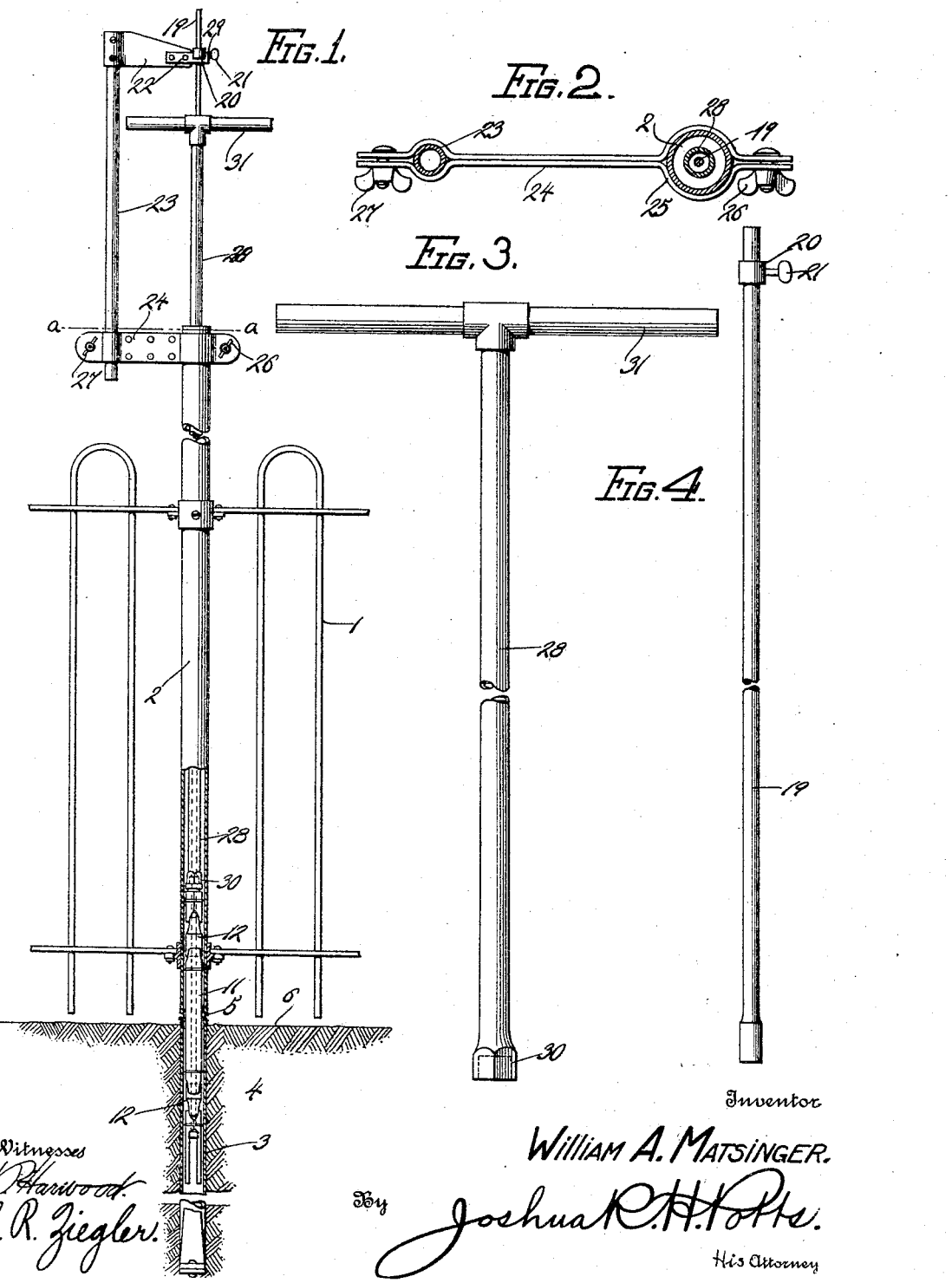

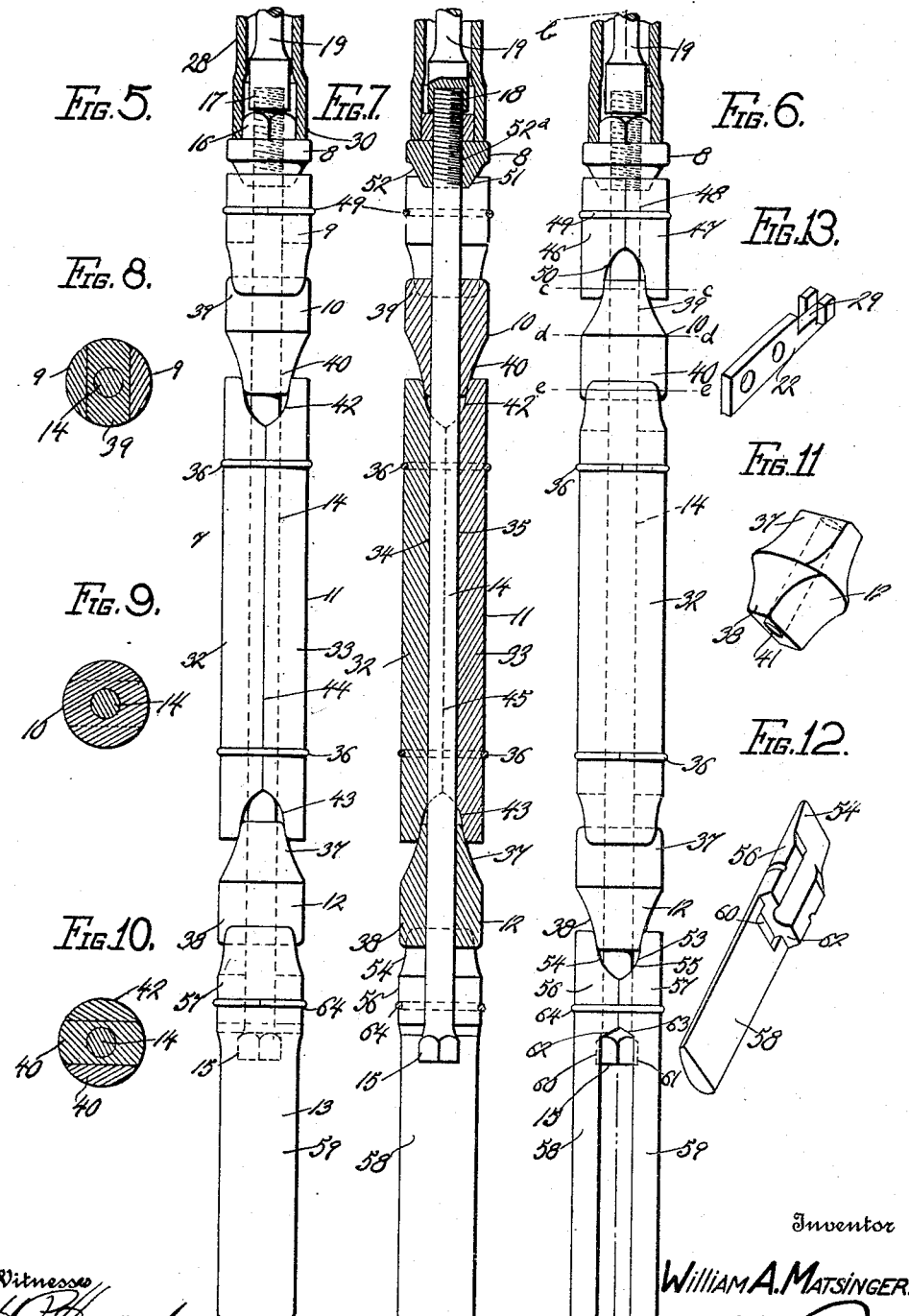

WILLIAM A. MATSINGER, OF PHILADELPHIA, PENNSYLVANIA.

COUPLING DEVICE FOR TUBULAR POLES.

1,213,228.  Specification of Letters Patent.  Patented Jan. 23, 1917.

Application filed May 18, 1916. Serial No. 98,469.

*To all whom it may concern:*

Be it known that I, WILLIAM A. MATSINGER, a citizen of the United States, residing at Philadelphia, in the county of Philadelphia and State of Pennsylvania, have invented certain new and useful Improvements in Coupling Devices for Tubular Poles, of which the following is a specification.

My invention consists of an improved coupling device and is particularly serviceable for repairing tubular clothes-line poles which have become broken transversely of their length either by rusting or from other causes. However, it will be understood that my invention is valuable in any instance where it is desired to couple two lengths of pipe or tube.

One object of my invention is to provide a coupling device which may be easily and quickly inserted within two lengths of pipe or tube to effectively secure them together.

Another object of my invention is to so construct my improved coupling device that it may be used to reinforce or strengthen a tube which has been partially broken transversely of its length.

A still further object is to so construct my invention that it will be durable and that the portions of tube which are coupled thereby will be by the construction of my invention, as strong and in some instances stronger than the remaining portion of the tube.

Another object is to so construct my invention that it can be easily and quickly assembled and can be cheaply manufactured.

These objects, and other advantageous ends which will be described hereinafter, I attain in the following manner, reference being had to the accompanying drawings in which—

Figure 1 is a front elevation partly in section showing my invention as applied to a broken clothes-line pole which forms a part of a fence, and such as is in common use. Fig. 2 is a transverse section taken on the line $a$—$a$ Fig. 1, drawn on an enlarged scale. Fig. 3 is a side elevation of a tubular wrench forming a part of my invention. Fig. 4 is an elevation of a suspension bar designed to be inserted within the tubular wrench shown in Fig. 3 and forms another element of my invention. Fig. 5 is a front elevation of the coupling elements of my invention joined together and as they appear when inserted within the tubes to be coupled, and showing a portion of the tubular wrench in section and the suspension rod in its operative position. Fig. 6 is a side elevation of Fig. 5 showing a portion of the tubular wrench in section and the suspension rod in its operative position. Fig. 7 is a longitudinal section taken on the line $b$—$b$ of Fig. 6. Figs. 8, 9, and 10, are transverse sectional views taken respectively on the lines $c$—$c$, $d$—$d$, and $e$—$e$ of Fig. 6. Fig. 11 is a perspective view of one of the elements of my invention and which I will hereinafter term a knuckle joint. Fig. 12 is a perspective view of one-half of one of the clamping members which forms a part of my invention. Fig. 13 is a perspective view of the forward ends of a supporting arm which I employ.

Referring to the drawings, 1 represents an iron fence which is commonly known as a "hair pin" fence, and 2 is a standard or pole which is used both in the capacity of a support for the fence and as a clothes line pole. This tube 2 has a portion 3 embedded within the ground 4, and for the purpose of clearly illustrating my invention, this tube is broken at 5, transversely to its length presumably by rusting of the tube adjacent the surface 6 of the ground.

The coupler 7 consists of a series of members 8, 9, 10, 11, 12, and 13, through which passes a tie-bolt 14 having an integral head 15 at its lower end and a nut 16 movable on the threaded end 17 of said tie-bolt, said threaded end being of sufficient length that when the said members are in their position ready to be inserted within the tube 2, a portion of the threaded end will extend beyond the nut 16 so as to be engaged by a threaded opening 18 on the end of a suspension bar 19, the latter having a collar 20 designed to be secured to the suspension bar 19 by a set screw 21, and this collar is designed to rest upon an arm 22 connected to a rod 23, the latter being adjustably mounted within a clamp 24 having a portion 25 designed to be clamped to the pole 2 by means of thumb screws 26. The clamp 24 is also provided with a thumb screw 27, so that when loosened the rod 23 may be adjusted vertically.

In order to insert the coupler 7 within the tube 2 in such manner that the coupler will extend partly above and partly below the broken portion 5 in the tube, the suspension rod 19 after first being relieved of its collar 20, is inserted within a tubular wrench 28 as clearly shown in Figs. 1 and 3. The suspension bar 19 is of such length as to extend entirely through the tubular wrench 28, and is screwed onto the upper threaded end 17 of the tie bolt 14, so that when the collar is inserted on the upper end of the suspension bar after the latter has been inserted through the tubular wrench as just described, the shank of the set screw 21 will rest within a groove 29 in the forward end of the supporting arm 22. The collar 20 rests on the arm 22 and after the suspension bar 19 has been moved so as to bring the section 11 of the coupler 7 in such position that the broken portion 5 will be substantially midway of its length, the set screw 21 is tightened and the coupler 7 is supported in a hanging state within the tube and across the broken portion 5. The opening 30 in the bottom of the tubular wrench 28, is shaped to correspond with the shape of the nut 16, and after the coupler 7 is positioned as just described, the tubular wrench is turned through the medium of the handle 31 and the nut 16 will then move on the threaded end 17 downwardly, and thereby clamp together all of said sections 8 to 13 inclusive. These sections are so constructed that when the wrench is turned as just described to move the nut 16 toward the head 15, that they will expand and tightly grip the inner surface of the tube both above and below the broken portion 5, and in order to more clearly define how this expansion takes place, I will describe each of the said sections separately and afterward give a description of their cooperative movements.

The central section 11, which is preferably made long, is made in two parts 32 and 33 and as shown in Fig. 7, these parts have recesses 34 and 35 which when placed together, provide a channel or passageway for the tie-bolt 14. These parts 32 and 33 are normally held together by split ring springs 36, and as illustrated in the drawing, two of these springs are shown, one adjacent each end of the section 11.

The knuckle-joint member 12 is solid, and is not divided as is the section 11, this knuckle joint being shaped as shown in Fig. 11 having elongated wedge-shaped ends 37 and 38. The knuckle joint 12 is similar in construction to the knuckle-joint member 10, and I have indicated the wedge-shaped ends of the knuckle joint 10 by reference characters 39 and 40 which are identical to the wedge portions 37 and 38 of the knuckle joint 12.

Each of the joints 10 and 12 has a hole 41 providing a passage for the tie bolt 14 and the wedge-shaped portion 40 of the joint 10, and the wedge-shaped portion 37 of the joint 12 are designed to fit within openings 42 and 43 respectively. These openings 42 and 43 are formed partly by cutting away the parts 32 and 33 of the section 11, and these openings terminate at the parting lines 44 and 45 (Figs. 5 and 7), so that the openings 42 and 43 are also wedge-shaped, and when the wedge-shaped ends 40 and 37 enter these openings, the sections 32 and 33 will be moved apart and engage the inner surface of the tube 2.

The section 9 is made in two symmetrical parts 46 and 47, which are each recessed internally to provide a passage 48 for the tie-bolt 14 in a manner similar to the parts of the section 11, and the parts are normally held together by a split-ring spring 49 similar in construction to the rings 36 of said section 11.

The wedge 40 of the knuckle joint 10 is disposed at right angles to the wedge 39 thereof, and the wedge 38 is at right angles to the wedge 37 of the knuckle joint 12. The parts 46 and 47 of the section 9 are each cut away to form a recess 50, this recess being identical to the recess 43 and designed to receive the wedge-shaped end 39 of the knuckle joint 10, and since said wedge-shaped end 39 is at right angles to the wedge 40 which engages the recess 42 of the section 11, and also since the parting lines of the portions 46 and 47 of the section 9 extend upwardly from the junction of the cut away portions forming the recess 50, said parting lines of said section 9 will be at right angles to the parting lines of the section 11, so that an expansion of the parts 46 and 47 of the section 9 will cause these parts to grip the interior surface of the tube in a direction at an angle to the expansion movement of the parts 32 and 33 of the section 11, thereby positively clamping all portions of the interior surface of the tube.

The upper portion of each of the sections 46 and 47 has a tapered recess 51 into which projects a frusto-conical extension 52 on the section 8. This section 8 is made in one piece and has an opening 52ª through which the tie-bolt 14 extends. The lower or wedge-shaped end 38 of the knuckle joint 12 is designed to enter recesses 53 which are formed by cutting away as at 54 and 55 to the two parts 56 and 57 of the section 13, and as the wedge 38 extends at right angles to the wedge 37 of the knuckle joint 12, and the line of parting of the parts 56 and 57 extends downwardly from the junction of the cut away portions 54 and 55, the said latter line of parting will be at right angles to the parting lines 44 and 45 of the section 11, but in direct alinement with the parting line of the section 9.

The section 13 is made with two depending prongs 58 and 59 which are spaced apart, and the inner surfaces of these prongs are recessed as shown at 60 and 61. The upper portion of these recesses intersect with two slanting or beveled faces 62 and 63 (see Figs. 6 and 12). The recesses 60 and 61 provide a housing for the square head 15 of the tie-bolt 14, and the parts 56 and 57 are normally held together by means of a ring spring 64, so that if the wedge 12 is moved within the recesses 53, and the head 15 of the tie-bolt is relatively moved upwardly against the beveled surfaces 62 and 63, the parts 56 and 57 will separate and clamp within the tube 2.

In order to move all of the sections relatively toward each other, as separately described in connection with the sections 8 to 13 inclusive, the tubular wrench 28 is turned and since the suspension bar 19 is held stationary, both as to longitudinal movement and rotary movement, the nut 16 will travel downwardly on the threaded end 17 of the tie-bolt 14, and the knuckle joints 10 and 12 will cause the parts of the section 11 to expand and also the lower ends of the section 9 and the upper ends of section 13. Simultaneous with this action, the head 15 of the tie-bolt will tend to move the prongs 58 and 59 apart, and the depending knuckle portion 52 will move the upper portion of the parts 46 and 47 apart, so that the sections 9, 11, and 13, will be expanded and clamped against the inner surface of the tube, both above and below the broken portion 5. After the sections have been thus expanded, the tubular wrench 28 and suspension bar 39 may be bodily removed from the tube 2, it merely being necessary to give the suspension bar 19 a few revolutions to relieve it from the upper threaded end 17 of the tie bolt 14, and the sections which are within the tube form a coupler which is in alinement with the sections of the pole 2, which are above and below the ground, so that the pole 2 is held firmly in an upright position.

I preferably make the several sections of the coupling device of metal of such thickness and strength that when they are held by the tie-bolt 14 in their expanded positions, they will provide a core for the tube which is at least as strong and even stronger than the unbroken portion of the tube.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described by invention, what I claim as new and desire to secure by Letters Patent is:

1. A series of expansive members made in parts, and a knuckle-joint member having oppositely disposed wedge portions, and means for moving said first members toward each other to be engaged by the wedge portions of said knuckle-joint members and thereby expanded, substantially as described.

2. A series of expansive members made in parts, and a knuckle-joint member having oppositely disposed wedge portions, arranged at angles to each other, and means for moving said first members toward each other, said first members having openings in their parts which extend to the parting between said parts, said partings of each of said first members extending at an angle to each other, said wedge portions being designed to enter said openings when said sections are moved toward each other to effect the expansion of the parts of each of said members in directions at an angle to each other, substantially as described.

3. A series of expansive members made in parts, and a knuckle-joint member having oppositely disposed wedge portions arranged at angles to each other, and a tie bolt passing through all of said members and operative to move said first members toward each other, said first members having openings in their parts which extend to the parting between said parts, said partings of each of said first members extending at an angle to each other, said wedge portions being designed to enter said openings when said sections are moved toward each other to effect the expansion of the parts of each of said members in directions at an angle to each other, substantially as described.

4. A coupling device for tubes, comprising a series of members, adjustable means for securing the members together, certain of said members being made of a number of parts, said latter members having openings extending to their parting lines, the partings of certain of said members being at angles to the partings of other of said members, and knuckle-joint members having wedge portions movable within said openings by said adjustable means, certain of the wedge portions being disposed at angles to other of the wedge portions to move said parts in different directions into gripping engagement with the inner surface of the tube when said adjustable means is actuated to move all of said members together, substantially as described.

5. A coupling device for tubes, comprising a series of expansive members, each being made in parts and having recesses forming a passage, a tie-bolt extending through said passages in said members and having a head on one end and provided with a screw-thread at its other end, a nut fitting said screw-thread, said members having openings at their ends extending to their parting lines, knuckle-joint members positioned between adjacent end portions of said first members and each having oppositely disposed wedge portions designed to extend within said openings, one end member of said series having beveled surfaces for engagement with the head on said tie-bolt and being made in a number of parts, the nut on said tie-bolt being in engagement with the opposite end member of the series and when turned operates to move said wedge portions within said openings to expand said parts into gripping engagement with the inner surface of the tube, said head on the tie-bolt also aiding by engagement with said beveled surfaces to move the parts of its coöperative member into gripping engagement with the inner surface of the tube, substantially as described.

6. A coupling device for tubes, comprising a series of expansive members arranged in axial alinement, each being made in parts and having recesses forming a passage, a tie-bolt extending through said passages and having a head on one end and provided with a screw-thread at its other end, a nut fitting said screw-thread, said members having openings extending to their parting lines, knuckle-joint members positioned between adjacent end portions of said first members and each having oppositely disposed wedge portions designed to extend within said openings, one end member of said series having beveled surfaces for engagement with the head on said tie-bolt and being made in a number of parts, the nut on said tie-bolt being in engagement with the opposite end member of the series and when turned operates to move said wedge portions within said openings to expand said parts into gripping engagement with the inner surface of the tube, said head on the tie-bolt also aiding by engagement with said beveled surfaces to move the parts of its coöperative member into gripping engagement with the inner surface of the tube, and means for normally holding said parts together, substantially as described.

7. A coupling device for tubes, comprising a series of members each having expansive parts provided with recesses, said recesses registering to form a passage, a tie-bolt extending through the passages of said members and having a head on one end and provided with a screw-thread at its other end, a nut fitting said screw-thread, said members having openings extending to their parting lines, knuckle-joint members positioned between adjacent end portions of said first members and having oppositely disposed wedge portions extending within said openings, one end member of said series having beveled surfaces for engagement with the head on said tie-bolt and being made in a number of parts, an opposite end member having a frusto-conical extension fitting within a tapered recess in the outer end of one of said expansive sections, the nut on said tie-bolt being in engagement with the outer end of said oppositie end member of the series and when turned operates to move said wedge portions within said openings to expand said parts into gripping engagement with the inner surface of the tube, said head on the tie-bolt also aiding by engagement with said beveled surfaces to move the parts of its coöperative member into gripping engagement with the inner surface of the tube, and resilient rings for normally holding the parts of said expansive sections together, substantially as described.

8. A coupling device for tubes, comprising a series of expansive members each being made in parts and having a recess forming a passage, a tie-bolt extending through said passage and having a head on one end and provided with a screw-thread at its other end, a nut fitting said screw-thread said latter members having openings extending to their parting lines, knuckle-joint members having oppositely disposed wedge portions extending at an angle to each other and within said opening, one end member of said series having beveled surfaces for engagement with the head on said tie-bolt, an opposite end member having a frusto-conical extension fitting within a tapered recess in the outer end of one of said expansive sections, the nut on said tie-bolt being in engagement with the outer end of said opposite end member of the series and when turned operates to move said wedge portions within said openings to expand said parts into gripping engagement with the inner surface of the tube, said head on the tie-bolt also aiding by engagement with said beveled surfaces to move the parts of its coöperative member into gripping engagement with the inner surface of the tube, means for normally holding said parts together, substantially as described.

9. A coupling device for tubes, comprising a series of expansive members each being made in parts and having registering recesses forming a passage, a tie-bolt extending through said passage and having a head on one end and provided with a screw-thread at its other end, a nut fitting said screw-thread, certain of said sections being made of a number of parts, said latter members having openings extending to their parting lines, knuckle-joint members each having oppositely disposed wedge portions extending within said openings, one end member of said series having beveled surfaces for engagement with the head on said tie-bolt and being made in a number of parts, the nut on said tie-bolt being in engagement with the opposite end member of the series and when turned operates to move said wedge portions within said openings to expand said parts into gripping engagement with the inner surface of the tube, said head on the tie-bolt also aiding by engagement with said beveled surfaces to move the part of its coöperative member into gripping engagement with the inner surface of the tube, said wedge portions being disposed at an angle to other wedge portions so as to move said parts in different directions into gripping engagement with the inner surface of the tube, substantially as described.

In testimony whereof I have signed my name to this specification in the presence of two subscribing witnesses.

WILLIAM A. MATSINGER.

Witnesses:
RHODA E. GILLIES,
CHAS. E. POTTS.

Copies of this patent may be obtained for five cents each, by addressing the "Commissioner of Patents, Washington, D. C."